(12) United States Patent
Behroozpour

(10) Patent No.: US 12,066,535 B2
(45) Date of Patent: Aug. 20, 2024

(54) MONITORING SIGNAL CHIRP IN LIDAR OUTPUT SIGNALS

(71) Applicant: SiLC Technologies, Inc., Monrovia, CA (US)

(72) Inventor: Behnam Behroozpour, South San Francisco, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 828 days.

(21) Appl. No.: 16/875,987

(22) Filed: May 16, 2020

(65) Prior Publication Data

US 2021/0356592 A1 Nov. 18, 2021

(51) Int. Cl.
*G01S 17/34* (2020.01)
*G01S 7/4912* (2020.01)
*G01S 7/4913* (2020.01)

(52) U.S. Cl.
CPC ............ *G01S 17/34* (2020.01); *G01S 7/4913* (2013.01); *G01S 7/4918* (2013.01)

(58) Field of Classification Search
CPC ...... G01S 17/34; G01S 7/4913; G01S 7/4918; G01S 7/4911; G01S 7/4917; G01S 7/499
See application file for complete search history.

(56) References Cited

U.S. PATENT DOCUMENTS

| | | | | |
|---|---|---|---|---|
| 5,995,810 | A * | 11/1999 | Karasawa | H04Q 11/0478 370/468 |
| 2002/0122398 | A1 | 9/2002 | Jou | |
| 2004/0081388 | A1 | 4/2004 | Koyama | |
| 2014/0376001 | A1 * | 12/2014 | Swanson | G02B 6/29302 356/479 |
| 2015/0333480 | A1 | 11/2015 | Santis et al. | |
| 2018/0073932 | A1 | 3/2018 | Minet et al. | |
| 2019/0072672 | A1 | 3/2019 | Yao | |
| 2019/0086518 | A1 | 3/2019 | Hallstig et al. | |
| 2019/0339388 | A1 | 11/2019 | Crouch et al. | |
| 2019/0353789 | A1 | 11/2019 | Boloorian et al. | |
| 2019/0391243 | A1 | 12/2019 | Nicolaescu | |

(Continued)

FOREIGN PATENT DOCUMENTS

WO 2019/121069 A1 6/2019

OTHER PUBLICATIONS

Kim, Harry, International Search Report and Written Opinion, PCT/US2021/032095, International Searching Authority, United States Patent and Trademark Office, Sep. 10, 2021.

(Continued)

*Primary Examiner* — Luke D Ratcliffe
*Assistant Examiner* — Sanjida Naser
(74) *Attorney, Agent, or Firm* — Gavrilovich, Dodd & Lindsey LLP

(57) ABSTRACT

A LIDAR system includes at least one optical component configured to output a system output signal that travels away from the LIDAR system and can be reflected by an object located outside of the LIDAR system. The LIDAR system also includes a control mechanism configured to control one or more process variables of the system output signal. The control mechanism uses an electrical process variable signal to control the process variable. The process variable signal has an in-phase component and a quadrature component.

20 Claims, 10 Drawing Sheets

(56) References Cited

U.S. PATENT DOCUMENTS

2022/0365214 A1* 11/2022 Sandborn ............... G01S 7/497

OTHER PUBLICATIONS

Lee, Sun Hwa, International Preliminary Report on Patentability and Written Opinion, PCT/US2021/032095, The International Bureau of WIPO, Dec. 1, 2022.
Behroozpour, B. et al., "Lidar System Architectures and Circuits," IEEE Communications Magazine, pp. 135-142, 2017.
Behroozpour, B. et al., "Electronic-Photonic Integrated Circuit for 3D Microimaging," IEEE Journal of Solid-State Circuits, vol. 52, pp. 161-172, 2017.
Satyan, N. et al, "Precise control of broadband frequency chirps using optoelectronic feedback," Optics Express, vol. 17, pp. 15991-15999, 2009.
Vasilyev, A. et al., "The Optoelectronic Swept-Frequency Laser and Its Applications in Ranging, Three-Dimensional Imaging, and Coherent Beam Combining of Chirped-Seed Amplifiers," CaltechThesis, 2013.
Mercier, Francois, Extended European Search Report, European Patent Office, Application No. 21807500.0, May 13, 2024.

* cited by examiner

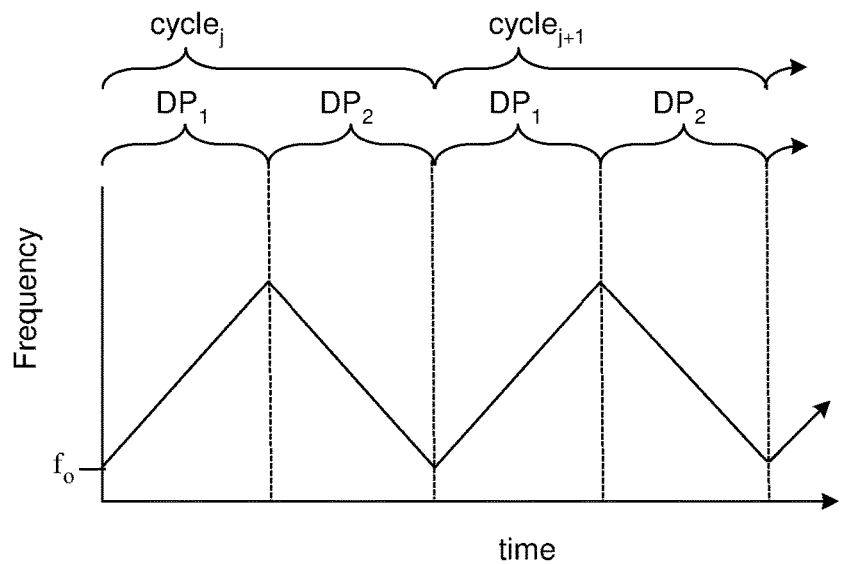
Figure 5C
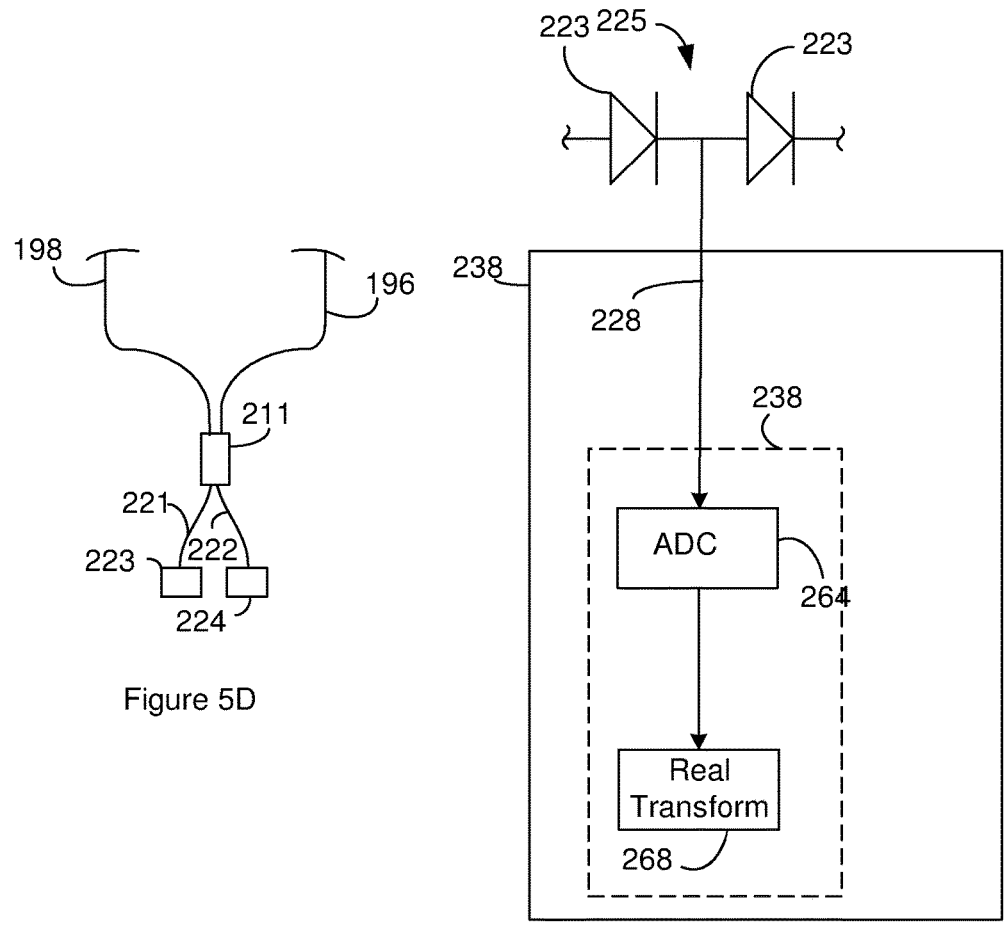
Figure 5D
Figure 5E

MONITORING SIGNAL CHIRP IN LIDAR OUTPUT SIGNALS

FIELD

The invention relates to optical devices. In particular, the invention relates to LIDAR systems.

BACKGROUND

There is an increasing commercial demand for LIDAR systems that can be deployed in applications such as ADAS (Advanced Driver Assistance Systems) and AR (Augmented Reality). LIDAR (Light Detection and Ranging) systems typically output a system output signal that is reflected by an object located outside of the LIDAR system. At least a portion of the reflected light signal returns to the LIDAR system. The LIDAR system directs the received light signal to a light sensor that converts the light signal to an electrical signal. Electronics can use the light sensor output to quantify LIDAR data that indicates the radial velocity and/or distance between the object and the LIDAR system.

Many LIDAR systems tune the frequency of the system output signal linearly or with other well-defined waveforms versus time to enable the accurate measurement of LIDAR data. In these instances, the LIDAR system can monitor the frequency of the system output signal and tune the frequency in response to the monitored frequency to achieve the desired waveform shape. The systems used to monitor the frequency of the system output signal can require one or more waveguides that need to be undesirably long in order to achieve the desired results. As a result of this waveguide length, these systems often occupy a large percentage of the available space on a LIDAR chip. As a result, there is a need for an improved system for monitoring the frequency of LIDAR system output signals.

SUMMARY

A LIDAR system includes at least one optical component configured to output a system output signal that travels away from the LIDAR system and can be reflected by an object located outside of the LIDAR system. The LIDAR system also includes a control mechanism configured to control one or more process variables of the system output signal. The control mechanism uses an electrical process variable signal to control the process variable. The process variable signal has an in-phase component and a quadrature component.

BRIEF DESCRIPTION OF THE FIGURES

FIG. 5C is a graph of frequency versus time for a system output signal with triangular frequency tuning.

FIG. 5D illustrates another example of a processing component suitable for use with the LIDAR systems.

FIG. 5E provides a schematic of electronics that are suitable for use with a processing component constructed according to FIG. 5D.

FIG. 6A illustrates an interface between optical components and light sensors that can be positioned on a LIDAR chip.

FIG. 6B is a schematic of a relationship between the electronics and light sensors that can be included on a LIDAR chip.

DESCRIPTION

A LIDAR system includes a control mechanism configured to control a process variable of a system output signal. In some instances, the control mechanism is a control loop such as a feedback control loop. The system output signal is the light signal that is output by the LIDAR system and then returns to the LIDAR system after being reflected by an object located outside of the LIDAR system. The LIDAR system can then use the reflected light to generate LIDAR data for the object. Examples of process variables that can be controlled by the control mechanism include the frequency and/or the phase of the system output signal.

The control mechanism generates a control signal that carries data indicating the value of the process variable. The control signal is generated from a process variable signal that includes an in-phase component and a quadrature component. The process variable signal is beating as a result of contributions from signals of different frequencies. The use of the quadrature component allows the frequency of the control signal to be increased relative to frequency of the control signal that would result when a process variable signal includes only an in-phase component. Increasing the frequency of the control signal decreases the beat frequency of the process variable signal that is needed to determine a value for the process variable. In prior systems, the beat frequency was increased by increasing the length of one of the waveguides in a Mach-Zehnder interferometer. Since the quadrature component reduces the required beat frequency, the quadrature component also reduces the length that is needed for one of the waveguides in a Mach-Zehnder interferometer. Accordingly, the quadrature component can reduce the amount of space on a LIDAR chip that is occupied by a control mechanism.

Figure 1A:
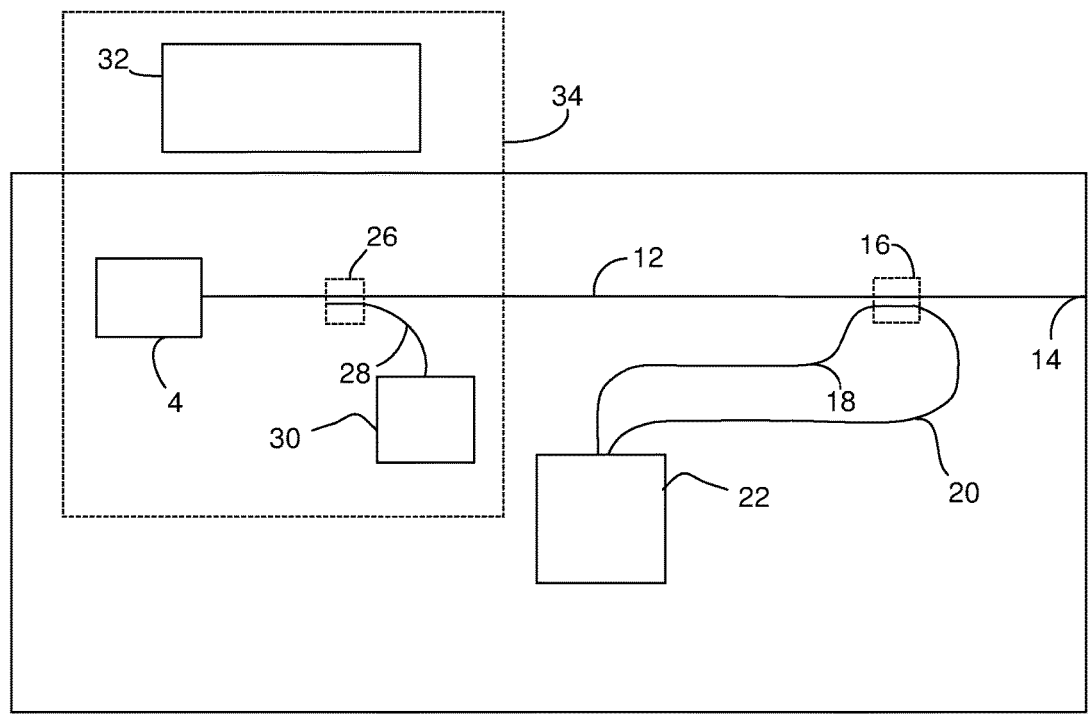
FIG. 1A is a topview of a schematic of a LIDAR system that includes or consists of a LIDAR chip that outputs a LIDAR output signal and receives a LIDAR input signal on a common waveguide.

FIG. 1A is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light source 4 that outputs a preliminary outgoing LIDAR signal. A suitable light source 4 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives an outgoing LIDAR signal from a light source 4. The utility waveguide 12 terminates at a facet 14 and carries the outgoing LIDAR signal to the facet 14. The facet 14 can be positioned such that the outgoing LIDAR signal traveling through the facet 14 exits the LIDAR chip and serves as a LIDAR output signal. For instance, the facet 14 can be positioned at an edge of the chip so the outgoing LIDAR signal traveling through the facet 14 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

The LIDAR output signal travels away from the LIDAR system through free space in the atmosphere in which the LIDAR system is positioned. The LIDAR output signal may be reflected by one or more objects in the path of the LIDAR output signal. When the LIDAR output signal is reflected, at least a portion of the reflected light travels back toward the LIDAR chip as a LIDAR input signal. In some instances, the LIDAR input signal can also be considered a system return signal. As an example, when the exit of the LIDAR output signal from the LIDAR chip is also an exit of the LIDAR output signal from the LIDAR system, the LIDAR input signal can also be considered a system return signal.

The LIDAR input signals can enter the utility waveguide 12 through the facet 14. The portion of the LIDAR input signal that enters the utility waveguide 12 serves as an incoming LIDAR signal. The utility waveguide 12 carries the incoming LIDAR signal to a splitter 16 that moves a portion of the outgoing LIDAR signal from the utility waveguide 12 onto a comparative waveguide 18 as a comparative signal. The comparative waveguide 18 carries the comparative signal to a processing component 22 for further processing. Although FIG. 1A illustrates a directional coupler operating as the splitter 16, other signal tapping components can be used as the splitter 16. Suitable splitters 16 include, but are not limited to, directional couplers, optical couplers, y-junctions, tapered couplers, and Multi-Mode Interference (MMI) devices.

The utility waveguide 12 also carrier the outgoing LIDAR signal to the splitter 16. The splitter 16 moves a portion of the outgoing LIDAR signal from the utility waveguide 12 onto a reference waveguide 20 as a reference signal. The reference waveguide 20 carries the reference signal to the processing component 22 for further processing.

The percentage of light transferred from the utility waveguide 12 by the splitter 16 can be fixed or substantially fixed. For instance, the splitter 16 can be configured such that the power of the reference signal transferred to the reference waveguide 20 is an outgoing percentage of the power of the outgoing LIDAR signal or such that the power of the comparative signal transferred to the comparative waveguide 18 is an incoming percentage of the power of the incoming LIDAR signal. In many splitters 16, such as directional couplers and multimode interferometers (MMIs), the outgoing percentage is equal or substantially equal to the incoming percentage. In some instances, the outgoing percentage is greater than 30%, 40%, or 49% and/or less than 51%, 60%, or 70% and/or the incoming percentage is greater than 30%, 40%, or 49% and/or less than 51%, 60%, or 70%. A splitter 16 such as a multimode interferometers (MMIs) generally provides an outgoing percentage and an incoming percentage of 50% or about 50%. However, multimode interferometers (MMIs) can be easier to fabricate in platforms such as silicon-on-insulator platforms than some alternatives. In one example, the splitter 16 is a multimode interferometer (MMI) and the outgoing percentage and the incoming percentage are 50% or substantially 50%. As will be described in more detail below, the processing component 22 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch for controlling operation of the light source 4. The control branch includes a splitter 26 that moves a portion of the outgoing LIDAR signal from the utility waveguide 12 onto a control waveguide 28. The coupled portion of the outgoing LIDAR signal serves as a tapped signal. Although FIG. 1A illustrates a directional coupler operating as the splitter 26, other signal tapping components can be used as the splitter 26. Suitable splitters 26 include, but are not limited to, directional couplers, optical couplers, y-junctions, tapered couplers, and Multi-Mode Interference (MMI) devices.

The control waveguide 28 carries the tapped signal to control components 30. The control components 30 can be in electrical communication with electronics 32. All or a portion of the control components 30 can be included in the electronics 32. During operation, the electronics can employ output from the control components 30 in a control mechanism 34 configured to control a process variable of one, two, or three controlled light signals selected from the group consisting of the tapped signal, the system output signal, and the outgoing LIDAR signal. Examples of the suitable process variables include the frequency of the controlled light signal and/or the phase of the controlled light signal.

Figure 1B:
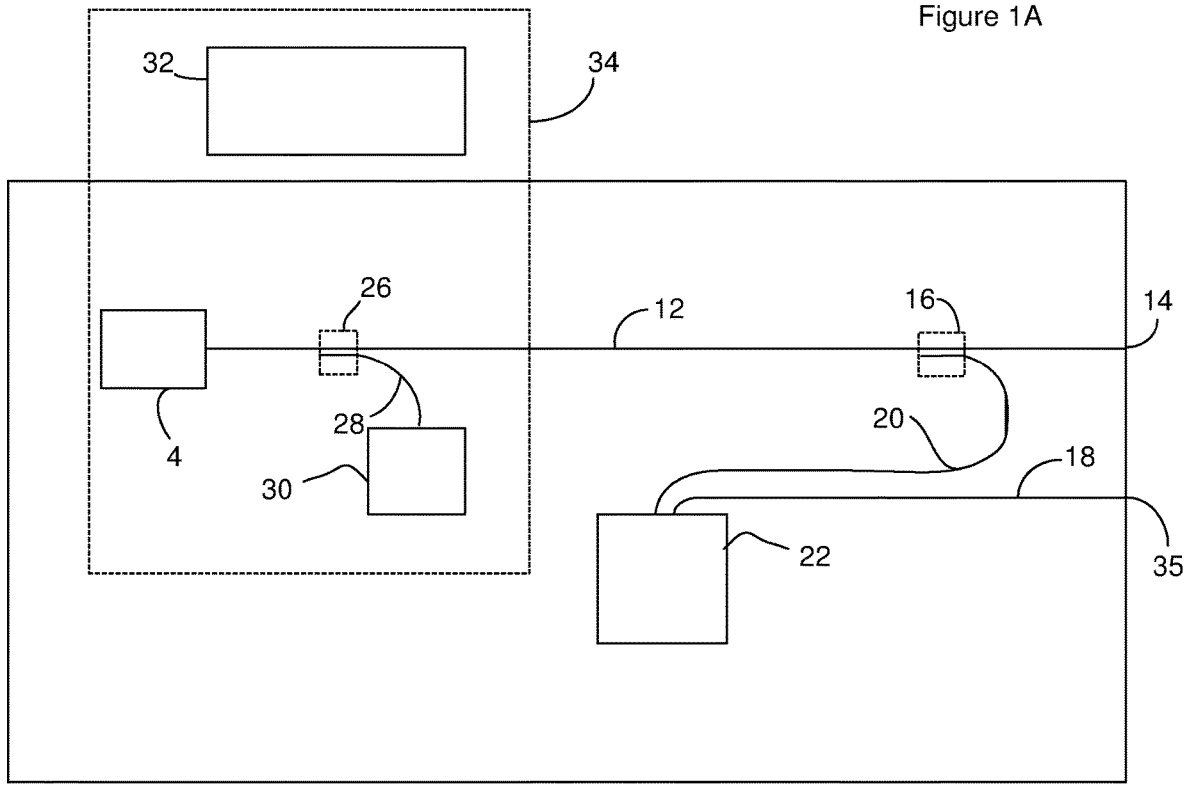
FIG. 1B is a topview of a schematic of a LIDAR system that includes or consists of a LIDAR chip that outputs a LIDAR output signal and receives a LIDAR input signal on different waveguides.

The LIDAR system can be modified so the incoming LIDAR signal and the outgoing LIDAR signal can be carried on different waveguides. For instance, FIG. 1B is a topview of the LIDAR chip of FIG. 1A modified such that the incoming LIDAR signal and the outgoing LIDAR signal are carried on different waveguides. The outgoing LIDAR signal exits the LIDAR chip through the facet 14 and serves as the LIDAR output signal. When light from the LIDAR output signal is reflected by an object external to the LIDAR system, at least a portion of the reflected light returns to the LIDAR chip as a first LIDAR input signal. The first LIDAR input signals enters the comparative waveguide 18 through a facet 35 and serves as the comparative signal. The comparative waveguide 18 carries the comparative signal to a processing component 22 for further processing. As described in the context of FIG. 1A, the reference waveguide 20 carries the reference signal to the processing component 22 for further processing. As will be described in more detail below, the processing component 22 combines the comparative signal with the reference signal to form a composite signal that carries LIDAR data for a sample region on the field of view.

Figure 1C:
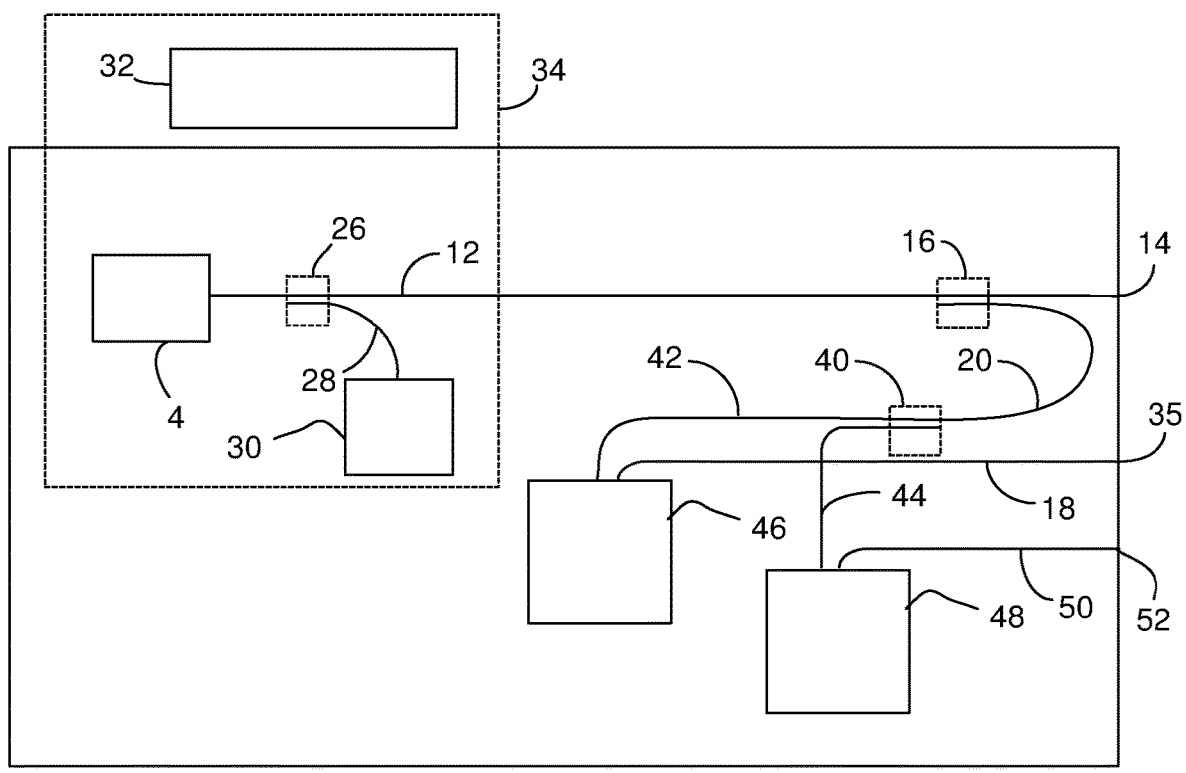
FIG. 1C is a topview of a schematic of another embodiment of a LIDAR system that that includes or consists of a LIDAR chip that outputs a LIDAR output signal and receives multiple LIDAR input signals on different waveguides.

The LIDAR chips can be modified to receive multiple LIDAR input signals. For instance, FIG. 1C illustrates the LIDAR chip of FIG. 1B modified to receive two LIDAR input signals. A splitter 40 is configured to place a portion of the reference signal carried on the reference waveguide 20 on a first reference waveguide 42 and another portion of the reference signal on a second reference waveguide 44. Accordingly, the first reference waveguide 42 carries a first reference signal and the second reference waveguide 44 carries a second reference signal. The first reference waveguide 42 carries the first reference signal to a first processing component 46 and the second reference waveguide 44 carries the second reference signal to a second processing component 48. Examples of suitable splitters 40 include, but are not limited to, y-junctions, optical couplers, and multimode interference couplers (MMIs).

The outgoing LIDAR signal exits the LIDAR chip through the facet 14 and serves as the LIDAR output signal. When light from the LIDAR output signal is reflected by one or more object located external to the LIDAR system, at least a portion of the reflected light returns to the LIDAR chip as a first LIDAR input signal. The first LIDAR input signals enters the comparative waveguide 18 through the facet 35 and serves as a first comparative signal. The comparative waveguide 18 carries the first comparative signal to a first processing component 46 for further processing.

Additionally, when light from the LIDAR output signal is reflected by one or more object located external to the LIDAR system, at least a portion of the reflected signal returns to the LIDAR chip as a second LIDAR input signal. The second LIDAR input signals enters a second comparative waveguide 50 through a facet 52 and serves as a second comparative signal carried by the second comparative waveguide 50. The second comparative waveguide 50 carries the second comparative signal to a second processing component 48 for further processing.

Although the light source 4 is shown as being positioned on the LIDAR chip, the light source 4 can be located off the LIDAR chip. For instance, the utility waveguide 12 can terminate at a second facet through which the outgoing LIDAR signal can enter the utility waveguide 12 from a light source 4 located off the LIDAR chip.

In some instances, a LIDAR chip constructed according to FIG. 1B or FIG. 1C is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view.

Figure 2:
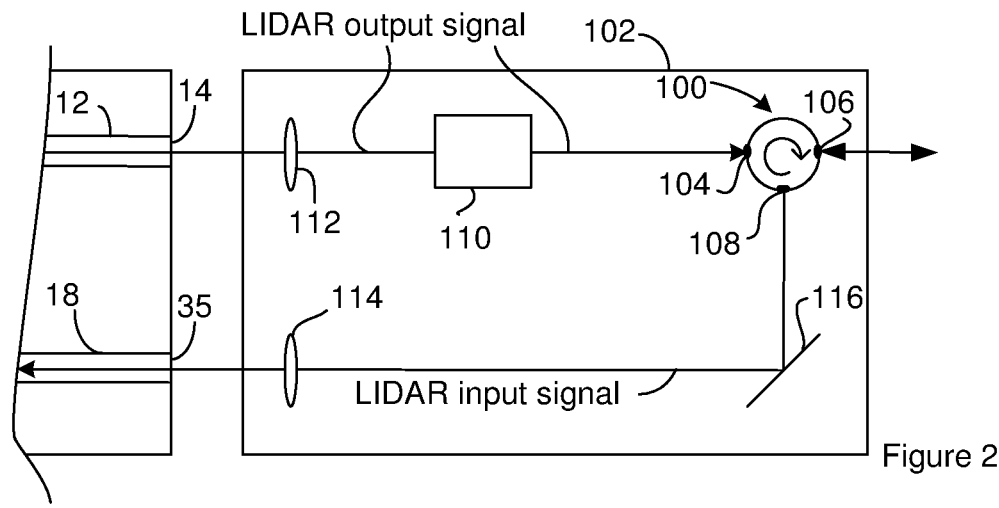
FIG. 2 is a topview of an example of a LIDAR adapter that is suitable for use with the LIDAR chip of FIG. 1B.

An example of a LIDAR adapter that is suitable for use with the LIDAR chip of FIG. 1B is illustrated in FIG. 2. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR system. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR system, the LIDAR output signal can also be considered a system output signal.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 2 illustrates the LIDAR output signal and the system return signal traveling between the LIDAR adapter and the sample region along the same optical path.

The system return signal exits the circulator 100 through the third port 108 and is directed to the comparative waveguide 18 on the LIDAR chip. Accordingly, all or a portion of the system return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 2, the LIDAR adapter can include optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the electronics 32 allowing the electronics 32 to control the power of the LIDAR output signal.

FIG. 2 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 35 of the comparative waveguide 18.

The LIDAR adapter can also include one or more direction changing components such as mirrors. FIG. 2 illustrates the LIDAR adapter including a mirror as a direction-changing component 116 that redirects the system return signal from the circulator 100 to the facet 20 of the comparative waveguide 18.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR system can be configured to compensate for polarization. Light from a laser source is typically linearly polarized and hence the LIDAR output signal is also typically linearly polarized. Reflection from an object may change the angle of polarization of the returned light. Accordingly, the system return signal can include light of different linear polarization states. For instance, a first portion of a system return signal can include light of a first linear polarization state and a second portion of a system return signal can include light of a second linear polarization state. The intensity of the resulting composite signals is proportional to the square of the cosine of the angle between the comparative and reference signal polarization fields. If the angle is 90 degrees, the LIDAR data can be lost in the resulting composite signal. However, the LIDAR system can be modified to compensate for changes in polarization state of the LIDAR output signal.

Figure 3:
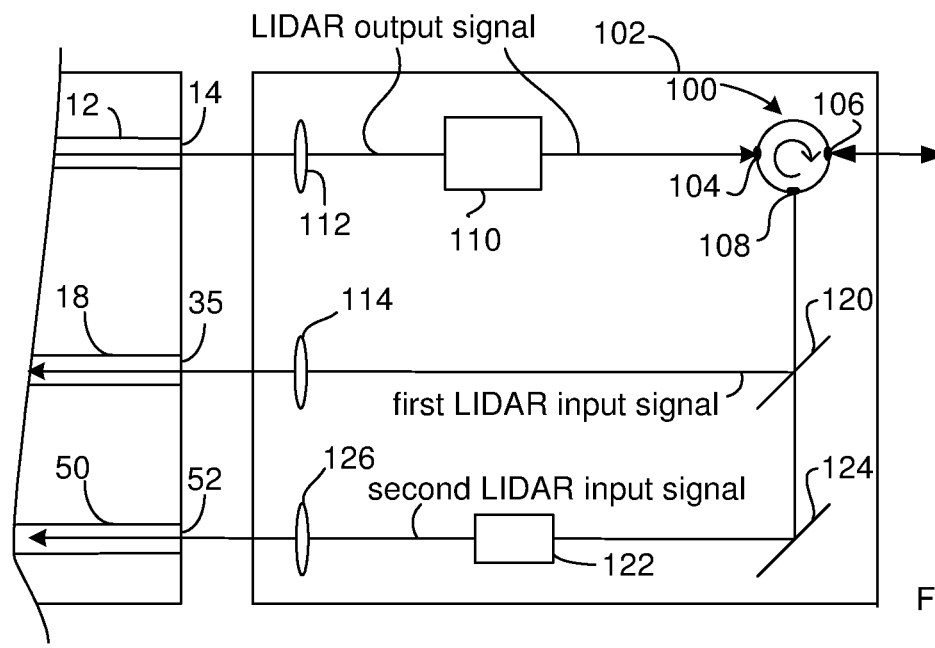
FIG. 3 is a topview of an example of a LIDAR adapter that is suitable for use with the LIDAR chip of FIG. 1C.

FIG. 3 illustrates the LIDAR system of FIG. 3 modified such that the LIDAR adapter is suitable for use with the LIDAR chip of FIG. 1C. The LIDAR adapter includes a beamsplitter 120 that receives the system return signal from the circulator 100. The beamsplitter 120 splits the system return signal into a first portion of the system return signal and a second portion of the system return signal. Suitable beamsplitters include, but are not limited to, Wollaston prisms, and MEMS-based beamsplitters.

The first portion of the system return signal is directed to the comparative waveguide 18 on the LIDAR chip and serves as the first LIDAR input signal described in the context of FIG. 1C. The second portion of the system return signal is directed a polarization rotator 122. The polarization rotator 122 outputs a second LIDAR input signal that is directed to the second input waveguide 76 on the LIDAR chip and serves as the second LIDAR input signal.

The beamsplitter 120 can be a polarizing beam splitter. One example of a polarizing beamsplitter is constructed such that the first portion of the system return signal has a first polarization state but does not have or does not substantially have a second polarization state and the second portion of the system return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 122 shown in FIG. 3 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 3, the first comparative signals, the second comparative signals, the first reference signals, and the second reference signals can each have light of the first polarization state.

As a result of the above configuration, first composite signals generated by the first processing component 46 and second composite signals generated by the second processing component 48 each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e. first composite signals and the second composite signal) from the sample region. In some instances, determining the LIDAR data for the sample region includes the electronics combining the LIDAR data from different composite signals (i.e. the composite signals and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 3 is described in the context of components being arranged such that the first comparative signals, the second comparative signals, the first reference signals, and the second reference signals each have the first polarization state, other configurations of the components in FIG. 3 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the system return signal has the first polarization state and the first portion of the system return signal has the second polarization state, the polarization rotator receives the first portion of the system return signal, and the outgoing LIDAR signal can have the second polarization state. In this example, the first LIDAR input signal and the second LIDAR input signal each has the second polarization state.

The above system configurations result in the first portion of the system return signal and the second portion of the system return signal being directed into different composite signals. As a result, since the first portion of the system return signal and the second portion of the system return signal are each associated with a different polarization state but electronics can process each of the composite signals, the LIDAR system compensates for changes in the polarization state of the LIDAR output signal in response to reflection of the LIDAR output signal.

The LIDAR adapter of FIG. 3 can include additional optical components including passive optical components. For instance, the LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 52 of the second comparative waveguide 50. The LIDAR adapter also includes one or more direction changing components 124 such as mirrors and prisms. FIG. 3 illustrates the LIDAR adapter including a mirror as a direction changing component 124 that redirects the second portion of the system return signal from the circulator 100 to the facet 52 of the second comparative waveguide 50 and/or to the third lens 126.

Figure 4:
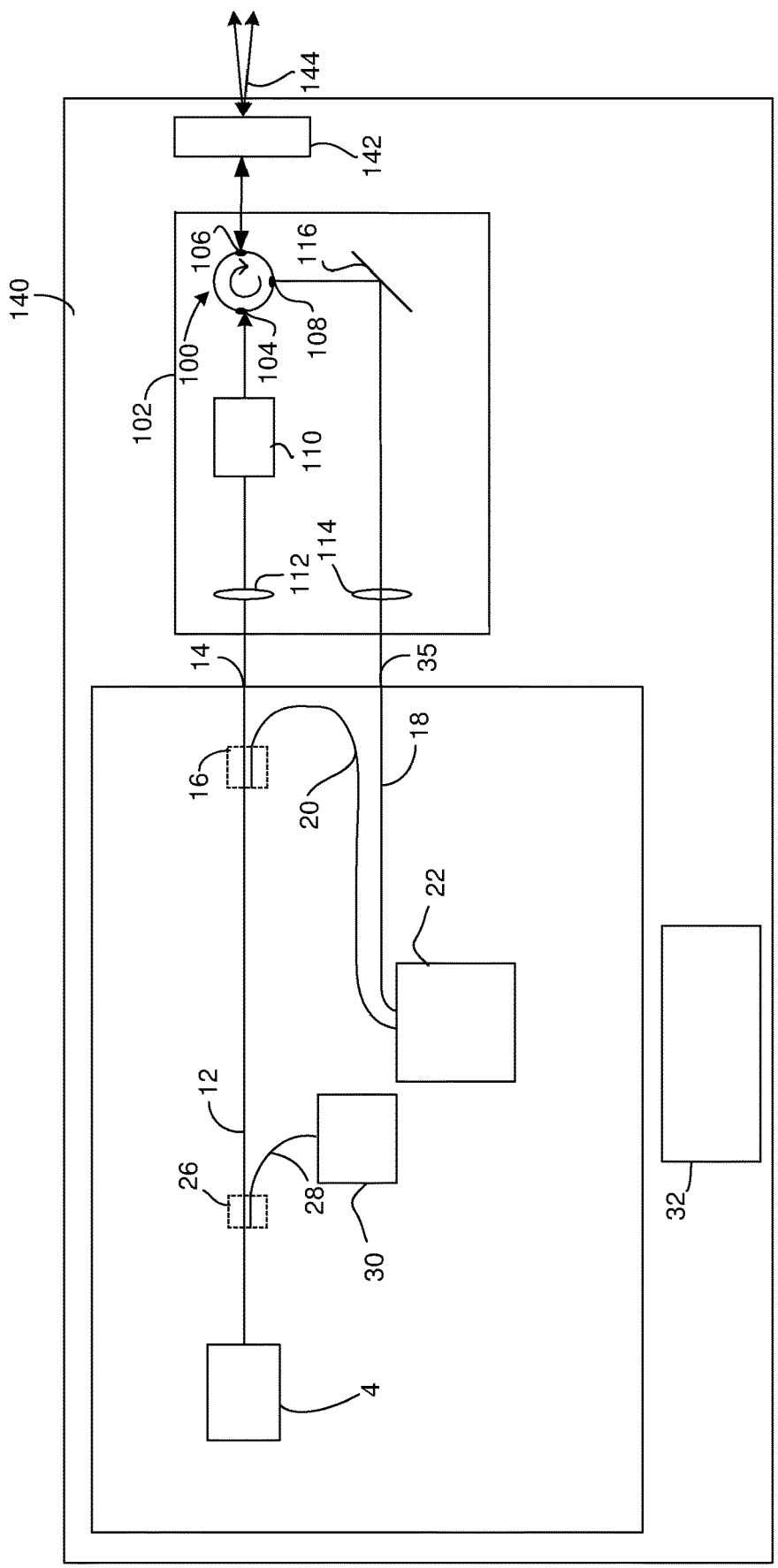
FIG. 4 is a topview of an example of a LIDAR system that includes the LIDAR chip of FIG. 1A and the LIDAR adapter of FIG. 2 on a common support.

When the LIDAR system includes a LIDAR chip and a LIDAR adapter, the LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR system that includes the LIDAR chip and electronics 32 of FIG. 1A and the LIDAR adapter of FIG. 2 on a common support 140. Although the electronics 32 are illustrated as being located on the common support, all or a portion of the electronics can be located off the common support. When the light source 4 is located off the LIDAR chip, the light source can be located on the common support 140 or off of the common support 140. Suitable approaches for mounting the LIDAR chip, electronics, and/or the LIDAR adapter on the common support include, but are not limited to, epoxy, solder, and mechanical clamping.

The LIDAR systems can include components including additional passive and/or active optical components. For instance, the LIDAR system can include one or more components that receive the LIDAR output signal from the LIDAR chip or from the LIDAR adapter. The portion of the LIDAR output signal that exits from the one or more components can serve as the system output signal. As an example, the LIDAR system can include one or more beam steering components that receive the LIDAR output signal from the LIDAR chip or from the LIDAR adapter and that output all or a fraction of the LIDAR output signal that serves as the system output signal. For instance, FIG. 4 illustrates a beam steering component 142 that receive a LIDAR output signal from the LIDAR adapter. Although FIG. 4 shows the beam steering component positioned on the common support 140, the beam steering component can be positioned on the LIDAR chip, on the LIDAR adapter, off the LIDAR chip, or off the common support 140. Suitable beam steering components include, but are not limited to, movable mirrors, MEMS mirrors, optical phased arrays (OPAs), and actuators that move the LIDAR chip, LIDAR adapter, and/or common support.

The electronics can operate the one or more beam steering component 142 so as to steer the system output signal to different sample regions 144. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

Figure 5A:
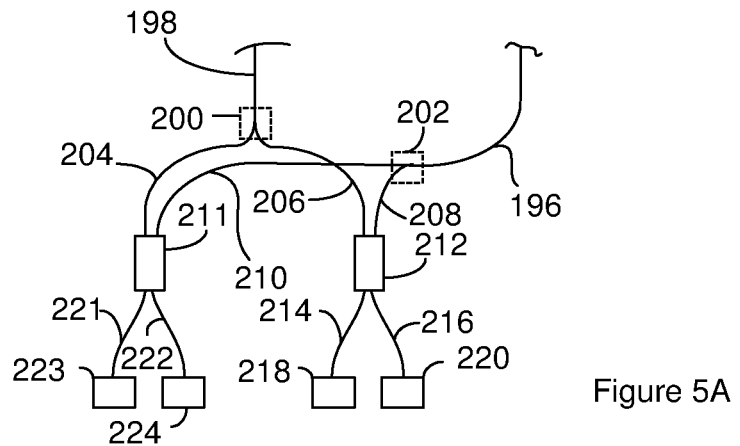
FIG. 5A illustrates an example of a processing component suitable for use with the LIDAR systems.
Figure 5B:
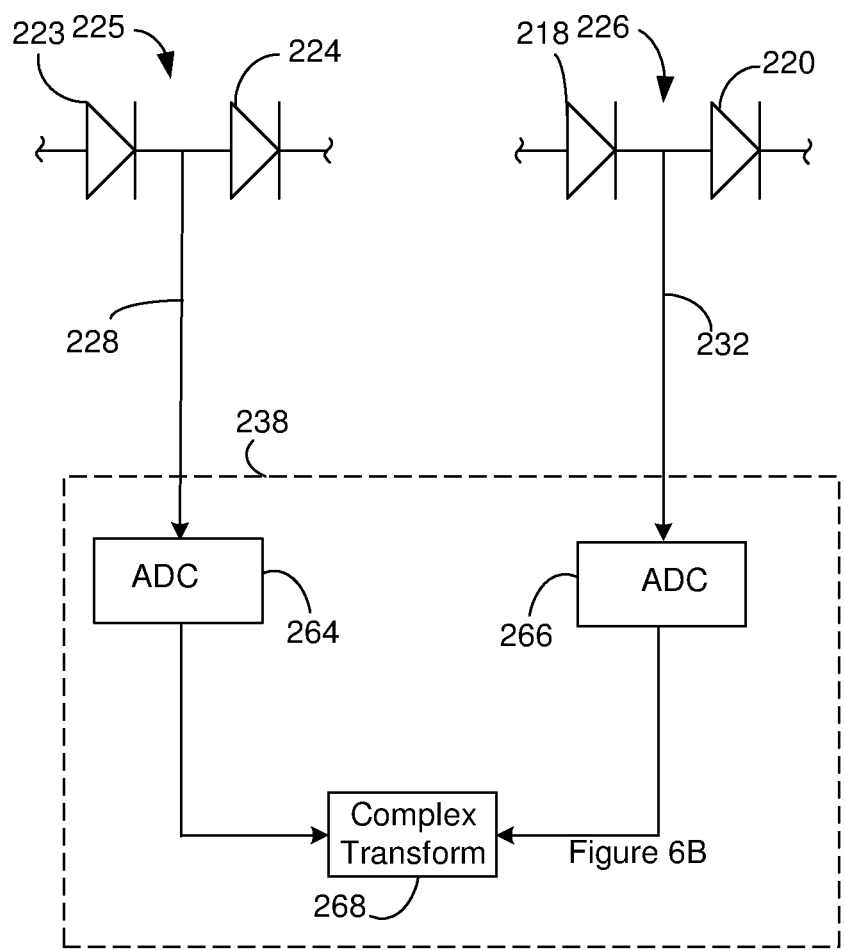
FIG. 5B provides a schematic of electronics that are suitable for use with a processing component constructed according to FIG. 5A.

FIG. 5A through FIG. 5C illustrate an example of a suitable processing component for use as all or a fraction of the processing components selected from the group consisting of the processing component 22, the first processing component 46 and the second processing component 48. The processing component receives a comparative signal from a comparative waveguide 196 and a reference signal from a reference waveguide 198. The comparative waveguide 18 and the reference waveguide 20 shown in FIG. 1A and FIG. 1B can serve as the comparative waveguide 196 and the reference waveguide 198, the comparative waveguide 18 and the first reference waveguide 42 shown in FIG. 1C can serve as the comparative waveguide 196 and the reference waveguide 198, or the second comparative waveguide 50 and the second reference waveguide 44 shown in FIG. 1C can serve as the comparative waveguide 196 and the reference waveguide 198.

The processing component includes a second splitter 200 that divides the comparative signal carried on the comparative waveguide 196 onto a first comparative waveguide 204 and a second comparative waveguide 206. The first comparative waveguide 204 carries a first portion of the comparative signal to the light-combining component 211. The second comparative waveguide 208 carries a second portion of the comparative signal to the second light-combining component 212.

The processing component includes a first splitter 202 that divides the reference signal carried on the reference waveguide 198 onto a first reference waveguide 204 and a second reference waveguide 206. The first reference waveguide 204 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 5B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 5B are included on the LIDAR chip. In some instances, the components illustrated in the schematic of FIG. 5B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 32 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the second Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The electronics use the one or more frequency peaks output from the transform component 268 for further processing to generate the LIDAR data (distance and/or radial velocity between the reflecting object and the LIDAR chip or LIDAR system). The transform component 268 can execute the attributed functions using firmware, hardware or software or a combination thereof.

FIG. 5C shows an example of a relationship between the frequency of the system output signal, time, cycles and data periods. The base frequency of the system output signal ($f_o$) can be the frequency of the system output signal at the start of a cycle.

FIG. 5C shows frequency versus time for a sequence of two cycles labeled $cycle_j$ and $cycle_{j+1}$. In some instances, the frequency versus time pattern is repeated in each cycle as shown in FIG. 5C. The illustrated cycles do not include re-location periods and/or re-location periods are not located between cycles. As a result, FIG. 5C illustrates the results for a continuous scan.

Each cycle includes K data periods that are each associated with a period index k and are labeled $DP_k$. In the example of FIG. 5C, each cycle includes two data periods labeled $DP_k$ with k=1 and 2. In some instances, the frequency versus time pattern is the same for the data periods that correspond to each other in different cycles as is shown in FIG. 5C. Corresponding data periods are data periods with the same period index. As a result, each data period $DP_1$ can be considered corresponding data periods and the associated frequency versus time patterns are the same in FIG. 5C. At the end of a cycle, the electronics return the frequency to the same frequency level at which it started the previous cycle.

During the data period $DP_1$, and the data period $DP_2$, the electronics operate the light source such that the frequency of the system output signal changes at a linear rate $\alpha$. The direction of the frequency change during the data period $DP_1$ is the opposite of the direction of the frequency change during the data period $DP_2$.

The frequency output from the Complex Fourier transform represents the beat frequency of the composite signals that each includes a comparative signal beating against a reference signal. The beat frequencies ($f_{LDP}$) from two or more different data periods can be combined to generate the LIDAR data. For instance, the beat frequency determined from $DP_1$ in FIG. 5C can be combined with the beat frequency determined from $DP_2$ in FIG. 5C to determine the LIDAR data. As an example, the following equation applies during a data period where electronics increase the frequency of the outgoing LIDAR signal during the data period such as occurs in data period $DP_1$ of FIG. 5C: $f_{ub}=-f_d+\alpha\tau$ where $f_{ub}$ is the frequency provided by the transform component 268 ($f_{LDP}$ determined from $DP_1$ in this case), $f_d$ represents the Doppler shift ($f_d=2vf_c/c$) where $f_c$ represents the optical frequency ($f_o$), c represents the speed of light, v is the radial velocity between the reflecting object and the LIDAR system where the direction from the reflecting object toward the LIDAR system is assumed to be the positive direction, and c is the speed of light. The following equation applies during a data period where electronics decrease the frequency of the outgoing LIDAR signal such as occurs in data period $DP_2$ of FIG. 5C: $f_{db}=-f_d-\alpha\tau$ where $f_{db}$ is a frequency provided by the transform component 268 ($f_{i,\ LDP}$ determined from $DP_2$ in this case). In these two equations, $f_d$ and $\tau$ are unknowns. The electronics solve these two equations for the two unknowns. The radial velocity for the sample region then be quantified from the Doppler shift ($v=c*f_d/(2f_c)$) and/or the separation distance for that sample region can be quantified from $c*f_d/2$.

In some instances, more than one object is present in a sample region. In some instances when more than one object is present in a sample region, the transform may output more than one frequency where each frequency is associated with a different object. The frequencies that result from the same object in different data periods of the same cycle can be considered corresponding frequency pairs. LIDAR data can be generated for each corresponding frequency pair output by the transform. As a result separate LIDAR data can be generated for each of the objects in a sample region.

Although FIG. 5A through FIG. 5B illustrate light-combining components that combine a portion of the reference signal with a portion of the comparative signal, the processing component can include a single light-combining component that combines the reference signal with the comparative signal so as to form a composite signal. As a result, at least a portion of the reference signal and at least a portion of the comparative signal can be combined to form a composite signal. The combined portion of the reference signal can be the entire reference signal or a fraction of the reference signal and the combined portion of the comparative signal can be the entire comparative signal or a fraction of the comparative signal.

As an example of a processing component that combines the reference signal and the comparative signal so as to form a composite signal, FIG. 5D through FIG. 5E illustrate the processing component of FIG. 5A through FIG. 5B modified to include a single light-combining component. The comparative waveguide 196 carries the comparative signal directly to the first light-combining component 211 and the reference waveguide 198 carries the reference signal directly to the first light-combining component 211.

The first light-combining component 211 combines the comparative signal and the reference signal into a composite signal. Due to the difference in frequencies between the comparative signal and the reference signal, the first composite signal is beating between the comparative signal and the reference signal. The first light-combining component 211 also splits the composite signal onto the first detector waveguide 221 and the second detector waveguide 222. The first detector waveguide 221 carries a first portion of the composite signal to the first light sensor 223 that converts the first portion of the second composite signal to a first electrical signal. The second detector waveguide 222 carries a second portion of the composite signal to the second light sensor 224 that converts the second portion of the second composite signal to a second electrical signal.

FIG. 5E provides a schematic of the relationship between the electronics, the first light sensor 223, and the second light sensor 224. The symbol for a photodiode is used to represent the first light sensor 223, and the second light sensor 224 but one or more of these sensors can have other constructions. In some instances, all of the components illustrated in the schematic of FIG. 5E are included on the LIDAR chip. In some instances, the components illustrated in the schematic of FIG. 5E are distributed between the LIDAR chip and electronics located off of the LIDAR chip.

The electronics connect the first light sensor 223 and the second light sensor 224 as a first balanced detector 225. In particular, the first light sensor 223 and the second light sensor 224 are connected in series. The serial connection in the first balanced detector is in communication with a first data line 228 that carries the output from the first balanced detector as a first data signal. The first data signal is an electrical representation of the composite signal.

The electronics 32 include a transform mechanism 238 configured to perform a mathematical transform on the first data signal. The mathematical transform can be a real Fourier transform with the first data signal as an input. The electronics can use the frequency output from the transform as described above to extract the LIDAR data.

Each of the balanced detectors disclosed in the context of FIG. 5A through FIG. 5E can be replaced with a single light sensor. As a result, the processing component can include one or more light sensors that each receives at least a portion of a composite signal in that the received portion of the composite signal can be the entire composite signal or a fraction of the composite signal.

As discussed in the context of FIG. 5C, the electronics 32 tune the frequency of the system output signal. One method to produce this frequency chirp is to modulate the electrical current applied to the light source by the electronics. In semiconductor lasers that can be used as the light source in the LIDAR system, current modulation results in frequency modulation via strong nonlinear carrier/photon coupling.

Figure 6A:
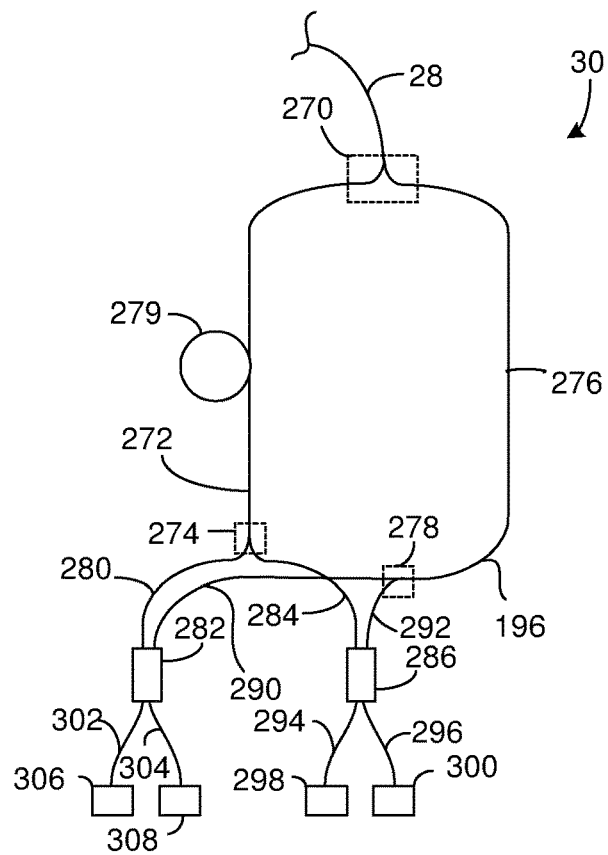
FIG. 6A and FIG. 6B illustrate an example of a suitable control component for use as all or a fraction of the control components disclosed in the context of FIG. 1A through FIG. 1C.
Figure 6B:
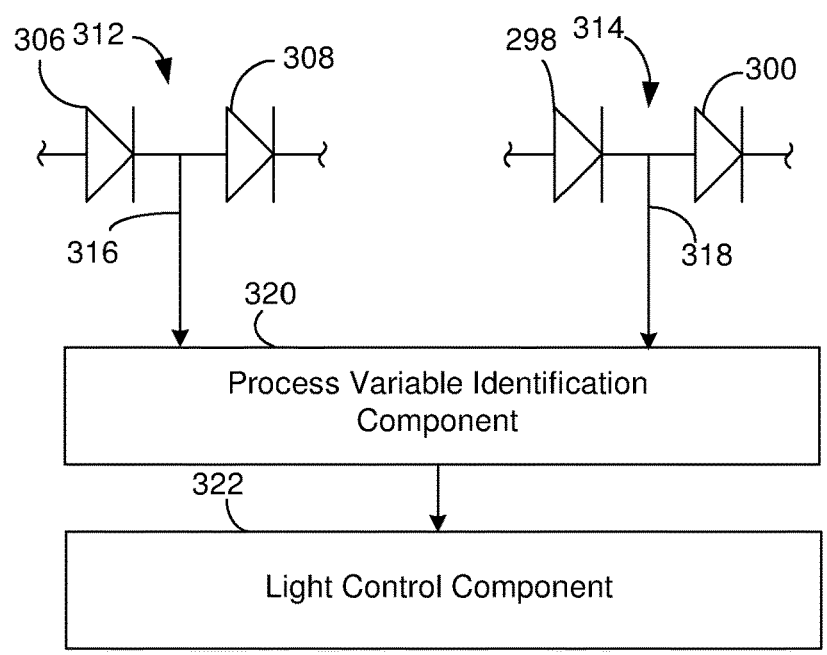

FIG. 6A and FIG. 6B illustrate an example of a suitable control component for use as all or a fraction of the control components 30 disclosed in the context of FIG. 1A through FIG. 1C and FIG. 4. The control components 30 includes a Mach-Zehnder interferometer configured to use light from the tapped signal to create an optical signal with an in-phase component and a quadrature component. The Mach-Zehnder interferometer receives the tapped signal from the control waveguide 28. The control waveguide guides the tapped signal to a splitter 270 that divides the tapped signal into a delayed signal and an expedited signal. A delay waveguide 272 carries the delayed signal to a first splitter 274. An expedited waveguide 276 carries the expedited signal to a second splitter 278. The delay waveguide 272 can include a delay section 279 that can be used to increase the length of the delay waveguide beyond the length of the expedited waveguide 276. For instance, the delay section 279 shown in FIG. 6A can represent a spiral arrangement of the delay waveguide 272. Suitable splitters for uses as the splitter 270, first splitter 274, and second splitter 278 include, but are not limited to, directional couplers, optical couplers, y-junctions, tapered couplers, and Multi-Mode Interference (MMI) devices.

The first splitter 274 divides the delayed signal into a first portion of the delayed signal and a second portion of the delayed signal. A first delayed waveguide 280 carries the first portion of the delayed signal to a first light-combining component 282. A second delayed waveguide 284 carries the second portion of the delayed signal to a second light-combining component 286.

The second splitter 278 divides the expedited signal into a first portion of the expedited signal and a second portion of the expedited signal. A first expedited waveguide 290 carries the first portion of the expedited signal to the first light-combining component 282. A second expedited waveguide 292 carries the second portion of the expedited signal to the second light-combining component 286.

The second light-combining component 286 combines the second portion of the expedited signal and the second portion of the delayed signal into a second beating signal. As noted above, the length of the delay waveguide exceeds the length of the expedited waveguide 276. As a result, the second portion of the delayed signal is delayed relative to the second portion of the expedited signal. Because the electronics can tune the frequency of the outgoing LIDAR signal, the delay causes the second portion of the delayed signal to have a different frequency than the second portion of the expedited signal. Due to the difference in frequencies between the second portion of the expedited signal and the second portion of the delayed signal, the second beating signal is beating between the second portion of the expedited signal and the second portion of the delayed signal.

The second light-combining component 286 also splits the second beating signal onto a first auxiliary detector waveguide 294 and a second auxiliary detector waveguide 296. The first auxiliary detector waveguide 294 carries a first portion of the second beating signal to a first auxiliary light sensor 298 that converts the first portion of the second beating signal to a first auxiliary electrical signal. The second auxiliary detector waveguide 296 carries a second portion of the second beating signal to a second auxiliary light sensor 300 that converts the second portion of the second beating signal to a second auxiliary electrical signal. Examples of suitable light sensors include germanium photodiodes (PDs), and avalanche photodiodes (APDs).

In some instances, the second light-combining component 286 splits the second beating signal such that the portion of the expedited signal (i.e. the portion of the second portion of the expedited signal) included in the first portion of the second beating signal is phase shifted by 180° relative to the portion of the expedited signal (i.e. the portion of the second portion of the expedited signal) in the second portion of the second beating signal but the portion of the delayed signal (i.e. the portion of the second portion of the delayed signal) in the second portion of the second beating signal is not phase shifted relative to the portion of the delayed signal (i.e. the portion of the second portion of the delayed signal) in the first portion of the second beating signal.

The first light-combining component 282 combines the first portion of the expedited signal and the first portion of the delayed signal into a first beating signal. The delay section 279 delays the first portion of the delayed signal relative to the first portion of the expedited signal. As a result, the first portion of the delayed signal is delayed relative to the first portion of the expedited signal. The delay causes the first portion of the delayed signal to have a different frequency than the first portion of the expedited signal. Due to the difference in frequencies between the first portion of the expedited signal and the first portion of the delayed signal, the first beating signal is beating between the second portion of the expedited signal and the second portion of the delayed signal.

The first light-combining component 282 also splits the first beating signal onto a first detector waveguide 302 and a second detector waveguide 304. The first detector waveguide 302 carries a first portion of the first beating signal to a first light sensor 306 that converts the first portion of the second beating signal to a first electrical signal. The second detector waveguide 304 carries a second portion of the second beating signal to a second light sensor 308 that converts the second portion of the second beating signal to a second electrical signal. Examples of suitable light sensors include germanium photodiodes (PDs), and avalanche photodiodes (APDs).

In some instances, the first light-combining component 282 splits the first beating signal such that the portion of the expedited signal (i.e. the portion of the first portion of the expedited signal) included in the first portion of the beating signal is phase shifted by 180° relative to the portion of the expedited signal (i.e. the portion of the first portion of the expedited signal) in the second portion of the beating signal but the portion of the delayed signal (i.e. the portion of the first portion of the delayed signal) in the first portion of the beating signal is not phase shifted relative to the portion of the delayed signal (i.e. the portion of the first portion of the delayed signal) in the second portion of the beating signal.

When the second light-combining component 286 splits the second beating signal such that the portion of the expedited signal in the first portion of the second beating signal is phase shifted by 180° relative to the portion of the expedited signal in the second portion of the second beating signal, the first light-combining component 282 also splits the beating signal such that the portion of the expedited signal in the first portion of the beating signal is phase shifted by 180° relative to the portion of the expedited signal in the second portion of the beating signal.

The first delayed waveguide 280, the second delayed waveguide 284, the first expedited waveguide 290, and the second expedited waveguide 292 can be configured such that the first beating signal and the second beating signal together act as an in-phase component and quadrature component of an optical process variable signal where the first beating signal is the in-phase component of the optical process variable signal and the second beating signal is the quadrature component of the optical process variable signal or such that the second beating signal is the in-phase component of the optical process variable signal and the first beating signal is the quadrature component of the optical process variable signal. For instance, the first delayed waveguide 280 and the second delayed waveguide 284 can be constructed to provide a phase shift between the first portion of the delayed signal and the second portion of the delayed signal while the first expedited waveguide 290 and the second expedited waveguide 292 are constructed such that the first portion of the expedited signal and the second portion of the expedited signal are in phase. As an example, the first delayed waveguide 280 and the second delayed waveguide 284 can be constructed so as to provide a 90° phase shift between the first portion of the delayed signal and the second portion of the delayed signal. Accordingly, one of the delayed signal portions can be a sinusoidal function and the other delayed signal portion can be a cosine function operating on the same argument as the sinusoidal function. In one example, the first delayed waveguide 280 and the second delayed waveguide 284 are constructed such that the first portion of the delayed signal is a cosine function and the second portion of the delayed signal is a sine function. In this example, the portion of the delayed signal in the second beating signal is phase shifted relative to the portion of the delayed signal in the first beating signal, however, the portion of the expedited signal in the first beating signal is not phase shifted relative to the portion of the expedited signal in the second beating signal.

In another example, the first delayed waveguide 280 and the second delayed waveguide 284 are constructed such that the first portion of the delayed signal and the second portion of the delayed signal are in phase while the first expedited waveguide 290 and the second expedited waveguide 292 are constructed to provide a phase shift between the first portion of the expedited signal and the second portion of the expedited signal. As an example, the first expedited waveguide 290 and the second expedited waveguide 292 can be constructed so as to provide a 90° phase shift between the first portion of the expedited signal and the second portion of the expedited signal. Accordingly, one of the expedited signal portions can be a sinusoidal function and the other expedited signal portion can be a cosine function operating on the same argument as the sinusoidal function. In one example, the first expedited waveguide 290 and the second expedited waveguide 292 are constructed such that the first portion of the expedited signal is a cosine function and the second portion of the expedited signal is a sine function operating on the same argument as the cosine function. In this example, the portion of the expedited signal in the second beating signal is phase shifted relative to the portion of the expedited signal in the first beating signal, however, the portion of the delayed signal in the first beating signal is not phase shifted relative to the portion of the delayed signal in the second beating signal.

The first light sensor 306 and the second light sensor 308 can be connected as a balanced detector and the first auxiliary light sensor 298 and the second auxiliary light sensor 300 can also be connected as a balanced detector. For instance, FIG. 6B provides a schematic of the relationship between the electronics, the first light sensor 306, the second light sensor 308, the first auxiliary light sensor 298, and the second auxiliary light sensor 300. The symbol for a photodiode is used to represent the first light sensor 306, the second light sensor 308, the first auxiliary light sensor 298, and the second auxiliary light sensor 300 but one or more of these sensors can have other constructions. In some instances, all of the components illustrated in the schematic of FIG. 6B are included on the LIDAR chip. In some instances, the components illustrated in the schematic of FIG. 6B are distributed between the LIDAR chip and electronics located off of the LIDAR chip.

The electronics connect the first light sensor 306 and the second light sensor 308 as a first balanced detector 312 and the first auxiliary light sensor 298 and the second auxiliary light sensor 300 as a second balanced detector 314. In particular, the first light sensor 306 and the second light sensor 308 are connected in series. Additionally, the first auxiliary light sensor 298 and the second auxiliary light sensor 300 are connected in series. The serial connection in the first balanced detector is in communication with a first data line 316 that carries the output from the first balanced detector as a first process variable signal. The serial connection in the second balanced detector is in communication with a second data line 318 that carries the output from the second balanced detector as a first process variable signal.

The first process variable signal is an electrical representation of the first beating signal and the second process variable signal is an electrical representation of the second beating signal. Accordingly, the first process variable signal is beating and the second process variable signal is beating. Additionally, the first process variable signal and the second process variable signal can each carry a different one of the components selected from a group consisting of the in-phase component of a process variable signal and the quadrature component of the process variable signal. For instance, the first process variable signal can include a contribution from a first waveform and a second waveform and the second process variable signal can include a contribution from the first waveform and the second waveform. The portion of the first waveform in the first process variable signal is phase-shifted relative to the portion of the first waveform in the second process variable signal but the portion of the second waveform in the first process variable signal is in-phase relative to the portion of the second waveform in the second process variable signal. For instance, the second process variable signal can include a portion of the delayed signal that is phase shifted relative to a different portion of the delayed signal that is included the first process variable signal. Additionally, the second process variable signal can include a portion of the expedited signal that is in-phase with a different portion of the expedited signal that is included in the first process variable signal. The first process variable signal and the second process variable signal are each beating as a result of the beating between the expedited signal and the delayed signal, i.e. the beating in the first beating signal and in the second beating signal.

The process variable signal is received by a process variable identification component 320. The process variable identification component 320 uses the process variable signal to output an indicator signal that indicates, is a function of, and/or can be used to determine the frequency of the tapped signal ($f_{TS}$). In some instances, the indicator signal is an analog signal with one or more characteristics that are related to the frequency of the tapped signal ($f_{TS}$). In some instances, the indicator signal is a digital signal that quantifies the frequency of the tapped signal ($f_{TS}$), is related to the frequency of the tapped signal ($f_{TS}$), or can be used to quantify the frequency of the tapped signal ($f_{TS}$). Because the system output signal and the tapped signal represent portions of the outgoing LIDAR signal, the frequency of the tapped signal ($f_{TS}$) can represent the value of the frequency for the outgoing LIDAR signal and/or for the system output signal.

The indicator signal can be received by a light control component 322. The light control component 322 can control the light source in response to the indicator signal. For instance, the light source can be controlled in a control architecture where the frequency of the tapped signal ($f_{TS}$) serves as the control process variable. When the process variable is the frequency of the tapped signal, the desired frequency for the LIDAR output signal serves as the reference variable. Because the frequency for the LIDAR output signal is modulated, the desired frequency for the LIDAR output signal as represented by the tapped signal changes as a function of time. For triangular modulation, FIG. 5C can represent an example of the desired waveform. As is evident from FIG. 5C the frequency of the tapped signal is a linear function of time. Accordingly, the control mechanism can control the light source such that the frequency of the tapped signal substantially maintains the desired waveform. Suitable control mechanisms include, but are not limited to, control architectures that make use of feedback control and/or feed forward control. Accordingly, the control mechanism can be a feedback control loop.

The light control component 322 can control the characteristics of the tapped signal, and accordingly the outgoing LIDAR signal and/or system output signal, in response to the value of an error signal determined from the value of the control process variable at a particular point in time and the value of the reference variable at the same point in time. For instance, the light control component 322 can control the characteristics of the tapped signal so as to reduce the value of the error signal. As an example, the light control component 322 can control the characteristics of the tapped signal such that the value of the control process variable moves toward to the value of the reference variable. In some instances, the control mechanism is a control loop such as a feedback control loop. When the control mechanism is a feedback control loop, the error signal for the control mechanism can be equal to the difference between the value of the control process variable and the value of the reference variable at a particular point in time.

When the process variable is the frequency of the tapped signal, the light control component 322 can transmit a light control signal that tunes the frequency of the tapped signal. For instance, the light control component 322 can tune the frequency of the tapped signal by transmitting a light control signal that changes the level of electrical current through the light source. Other light control signals are possible. For instance, when the light source is an electrostatic MEMS tunable laser, the light control component 322 can tune the frequency of the tapped signal by transmitting a light control signal that changes the level of voltage that moves the MEMS facet of the MEMS tunable laser.

In some instances, the light control component 322 and/or the process variable identification component 320 actually quantify the tapped signal ($f_{TS}$); however, this quantification is not necessary. For instance, when the indicator signal is an analog signal that includes a characteristic that is related to the tapped signal ($f_{TS}$), the light control signal can be derived directly from the indicator signal without actually quantifying the frequency of the tapped signal ($f_{TS}$). For instance, the control signal may be a one-to-one function of the indicator signal and/or of a transformed signal discussed below. As an example, the control signal may be a one-to-one function of the instantaneous frequency.

Figure 6C:
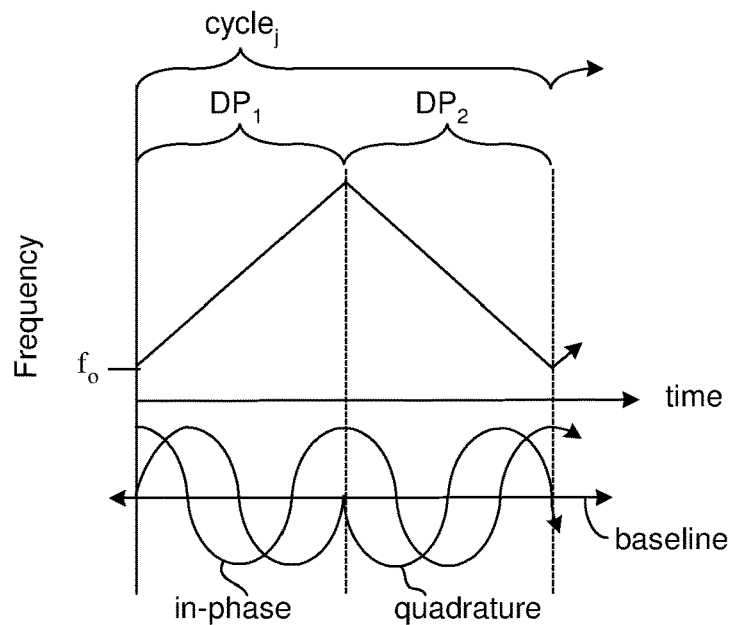
FIG. 6C is a graph showing an amplitude for an in-phase and quadrature components of a signal on the same time axis with the frequency of the system output signal.

FIG. 6C illustrates the amplitude for the in-phase and quadrature components of the optical process variable signal and/or the process variable signal on the same time axis with the frequency of the system output signal. For instance, FIG. 6C can compare the frequency of the system output signal during the first two data periods shown in FIG. 5C compared against the variation of the in-phase and quadrature components of the optical process variable signal and/or the process variable signal. Although FIG. 6C illustrates the optical process variable signal and/or the process variable signal having only one period per data period, the optical process variable signal and/or the process variable signal can have more than one period per data period.

Figure 6D:
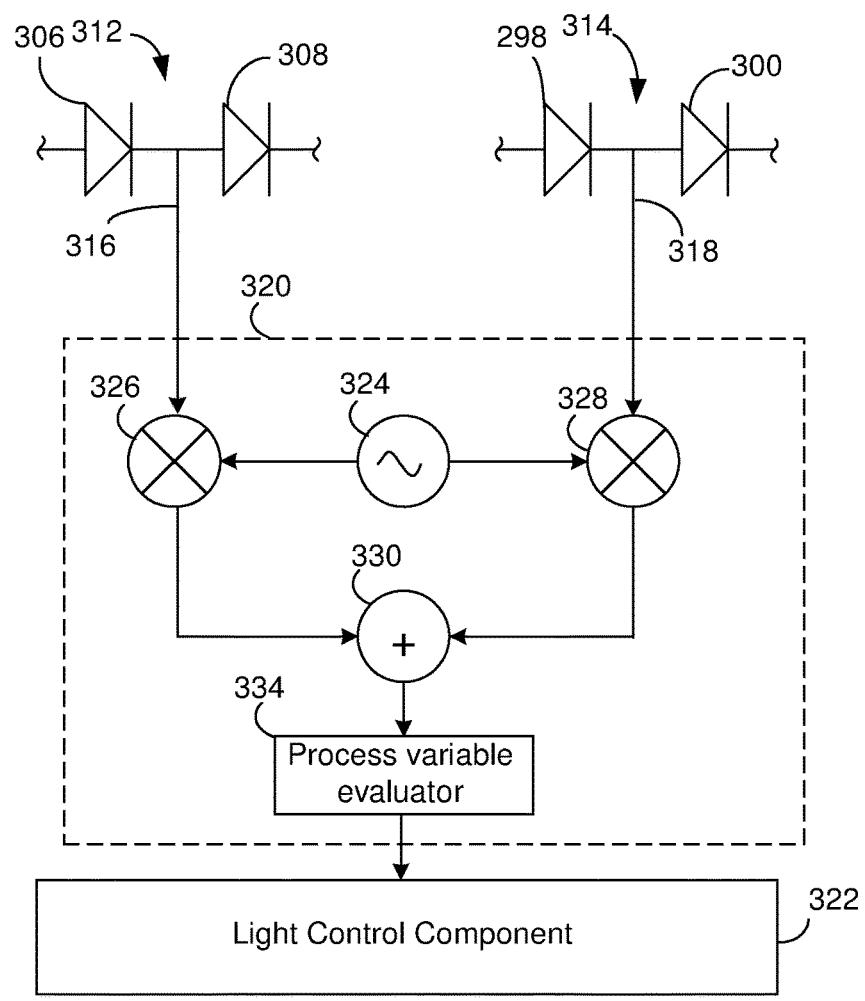
FIG. 6D illustrates one example of a process variable identification component suitable for use in the electronics of a LIDAR system.

A variety of process variable identification components 320 can be used to determine a value for the process variable indicator. FIG. 6D illustrates one example of a process variable identification component 320 that is suitable for use when the process variable is the frequency of the tapped signal, the outgoing LIDAR signal, and/or the system output signal. The illustrated process variable identification component 320 includes a local oscillator 324 that outputs a local signal that includes first local signal and a second local signal. The first local signal and the second local signal each carries a different one of the components selected from the group consisting of an in-phase component of the local signal and a quadrature component of the local signal.

The process variable identification component 320 also includes a first multiplier 326 that receives the first process variable signal and the first local signal. The first multiplier 326 multiplies the first process variable signal and the first local signal. When the first process variable signal carries the in-phase component of the process variable signal, the first local signal carries the quadrature component of the local signal. When the first process variable signal carries the quadrature component of the process variable signal, the first local signal carries the in-phase component of the local signal. The first multiplier 326 outputs a first multiplied signal.

The process variable identification component 320 also includes a second multiplier 328 that receives the second process variable signal and the second local signal. The second multiplier 328 multiplies the second process variable signal and the second local signal. When the second process variable signal carries the in-phase component of the process variable signal, the second local signal carries the quadrature component of the local signal. When the second process variable signal carries the quadrature component of the process variable signal, the second local signal carries the in-phase component of the local signal. The second multiplier 326 outputs a second multiplied signal.

The process variable identification component 320 includes an adder 330 that receives the first multiplied signal and the second multiplied signal. The adder 330 adds the first multiplied signal and the second multiplied signal and outputs a control signal.

The control signal is received at a process variable evaluator 334. The process variable evaluator 334 uses the control signal to output an indicator signal with one or more characteristics that are related to the frequency of the tapped signal ($f_{TS}$). For instance, the process variable evaluator 334 can be a Time-to-Digital Converter (TDC) that outputs an indicator signal with a voltage that is related to the frequency of the tapped signal ($f_{TS}$). In some instances, the Time-to-Digital Converter (TDC) outputs an indicator signal with a voltage that is proportional to the frequency of the tapped signal ($f_{TS}$). The indicator signal can be received by the light control component 322 for use in controlling the frequency of the light source.

Another example of a suitable process variable evaluator 334 is a frequency counter that outputs an indicator signal that indicates a time between baseline crossings (dn) of the control signal. The frequency determined for the tapped signal ($f_{TS}$) can be related to the time between baseline crossings (dn) by Equation 1: $f_{TS}=f_{LO}-1/(2*dn)$ where $f_{LO}$ represents the frequency of the local oscillator. The process variable evaluator 334 can output an indicator signal that carries data indicating a value of the frequency determined for the tapped signal ($f_{TS}$). The indicator signal can be received by the light control component 322 for use in controlling the frequency of the light source.

The local signal is selected such that the frequency of the control signal is higher than the frequency of the process variable signal. The increased frequency of the control signal increases the frequency that the process variable can be accurately sampled. Increasing this sampling frequency provides more accurate control of the process variable by the control mechanism. As a result, the increased frequency of the control signal enhances the control of the process variable by the control mechanism. Suitable sampling frequencies include, but are not limited to, sampling frequencies greater than 100 times the modulation frequency, where the modulation frequency is 1/(duration of a cycle). In some instances, all or a portion of the data periods in each cycle have a sampling frequency greater than 30 or 100 times per duration of the data period. In some instances, the local signal is selected such that the frequency of the control signal is more than 100, and less than 10,000 times higher than the frequency of the process variable signal.

Figure 6E:
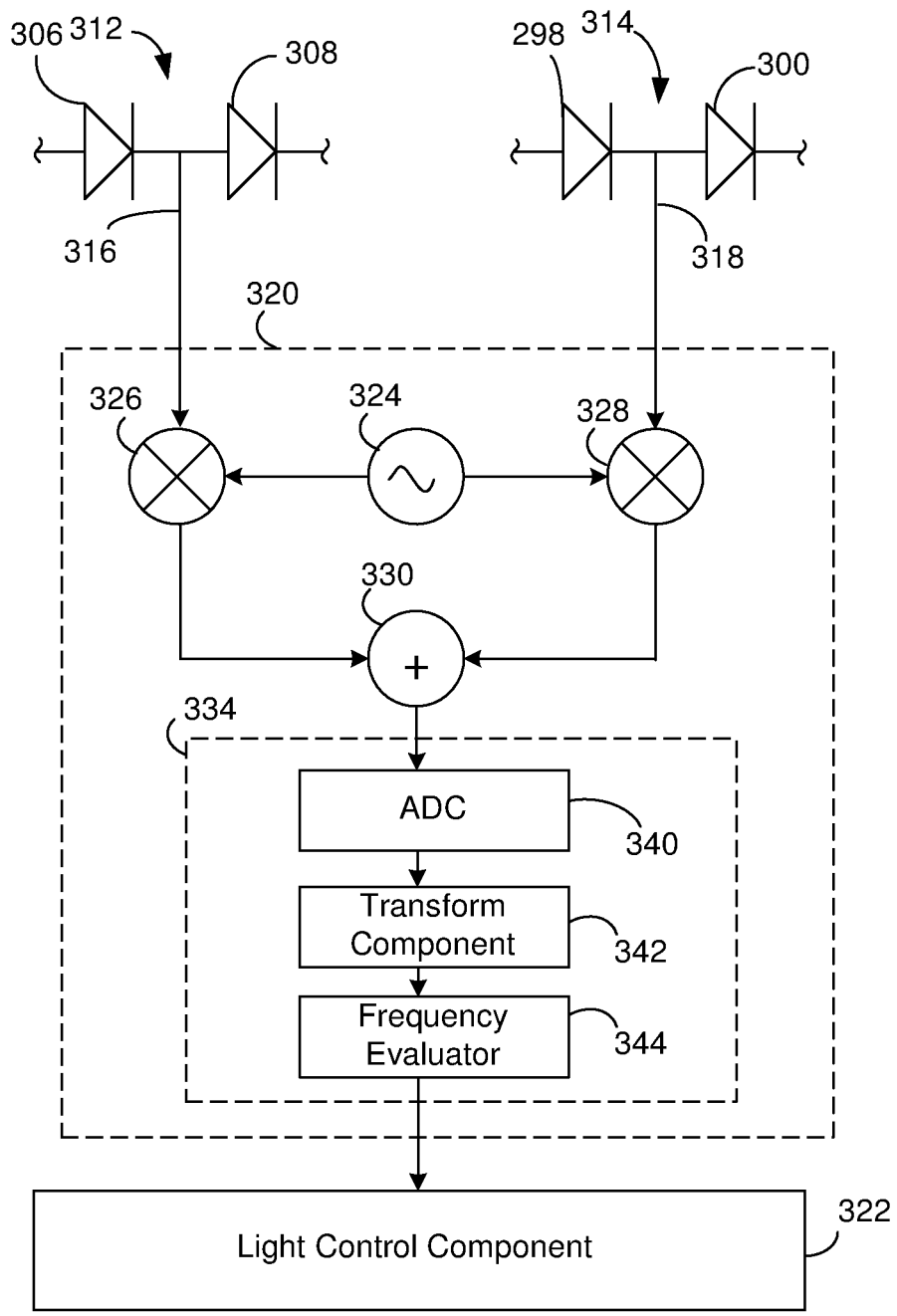
FIG. 6E illustrates another example of a process variable identification component suitable for use in the electronics of a LIDAR system.

FIG. 6E illustrates another example of a suitable process variable identification component 320 that is suitable for use when the process variable is the frequency of the tapped signal, the outgoing LIDAR signal, and/or the system output signal. The process variable identification component 320 includes an Analog-to-Digital Converter (ADC) 340 that receives the control signal from the adder 330. The Analog-to-Digital Converter (ADC) 340 converts the first process variable signal from an analog form to a digital form and outputs a digital data signal. The digital data signal is a digital representation of the control signal.

The process variable identification component 320 includes a transform component 342 that receives the digital data signal. The transform component 342 performs a mathematical transform on the digital data signal. The mathematical transform is selected such that the transform component 342 outputs a transformed signal that is related to, includes or indicates the frequency of the LIDAR output signal. A suitable first mathematical transform includes, but is not limited to, a Hilbert transform. A Hilbert transform outputs a transformed signal that indicates the instantaneous phase and, consequently, frequency of the control signal.

The transformed signal is received by a frequency evaluator 344. The frequency evaluator can be configured to output an indicator signal that is related to, includes and/or indicates the frequency of the LIDAR output signal. For instance, the frequency evaluator can convert the instantaneous frequency to the frequency of the tapped signal ($f_{TS}$) by $f_{TS}=(finst-f_{LO})*(T/\tau)$, where $f_{LO}$ is the frequency of the local oscillator, finst is the instantaneous frequency extracted from the Hilbert Transform, T is the duration of a data period in a triangular modulation scheme, and τ is the delay resulting from the length differential between the delay waveguide 272 and the expedited waveguide 276. Accordingly, the indicator signal can be a digital signal that quantifies the frequency of the frequency of the tapped signal ($f_{TS}$). The indicator signal can be received by the light control component 322 for use in controlling the frequency of the light source.

Although the indicator signal is described in the context of a signal that carries data regarding the frequency of the tapped signal, the indicator signal can carry data that is indirectly related to the frequency of the tapped signal. For instance, the indicator signal can carry data that can be used to determine the frequency of the tapped signal. As an example, the frequency of the tapped signal ($f_{TS}$) can be determined from the rate of phase change of the tapped signal. Accordingly, the indicator signal can carry data that indicates the rate of phase change of the tapped signal.

The process variable identification component 320 reduces the amount of delay that needs to be created by the delay waveguide 272 because it increases the sensitivity of the indicator signal to the frequency of the tapped signal by combining the information from in-phase and quadrature components at any given time. Prior systems attempted to increase this sensitivity by increasing the length of the delay waveguide 272. Because the process variable identification component 320 increases the sensitivity of the indicator signal, the length of the delay waveguide 272 can exceed the length of the expedited waveguide 276 by a lower amount than could be achieved in prior systems. For instance, the time delay in the delay waveguide 272 can exceed the time delay in the expedited waveguide 276 by an amount that is greater than or equal to 50 ps and less than or equal to 100 ns. In one example, the length of the delay waveguide 272 exceeds the length of the expedited waveguide 276 by an amount that is less than 1000 cm, less than 500 cm, or less than 100 cm and is greater than 0.0 cm or 0.4 cm. In one example, the delay waveguide 272 and the expedited waveguide 276 guide light through silicon and the length of the delay waveguide 272 exceed the length of the expedited waveguide 276 by an amount that is less than 1000 cm and greater than 0.0 cm or 0.4 cm.

Figure 7:
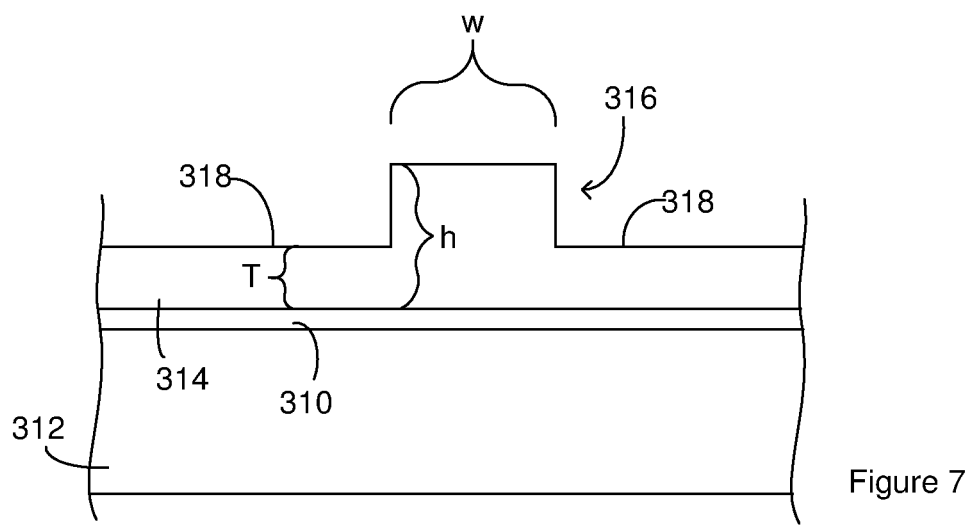
FIG. 7 is a cross-section of portion of a LIDAR chip that includes a waveguide on a silicon-on-insulator platform.

Suitable platforms for the LIDAR chips include, but are not limited to, silica, indium phosphide, and silicon-on-insulator wafers. FIG. 7 is a cross-section of portion of a chip constructed from a silicon-on-insulator wafer. A silicon-on-insulator (SOI) wafer includes a buried layer 310 between a substrate 312 and a light-transmitting medium 314. In a silicon-on-insulator wafer, the buried layer 310 is silica while the substrate 312 and the light-transmitting medium 314 are silicon. The substrate 312 of an optical platform such as an SOI wafer can serve as the base for the entire LIDAR chip. For instance, the optical components shown on the LIDAR chips of FIG. 1A through FIG. 1C can be positioned on or over the top and/or lateral sides of the substrate 312.

FIG. 7 is a cross section of a portion of a LIDAR chip that includes a waveguide construction that is suitable for use in LIDAR chips constructed from silicon-on-insulator wafers. A ridge 316 of the light-transmitting medium extends away from slab regions 318 of the light-transmitting medium. The light signals are constrained between the top of the ridge 316 and the buried oxide layer 310.

The dimensions of the ridge waveguide are labeled in FIG. 7. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 7 is suitable for all or a portion of the waveguides on LIDAR chips constructed according to FIG. 1A through FIG. 1C.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first auxiliary light sensor 218, the second auxiliary light sensor 220, the first light sensor 223, and the second light sensor 224.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14, 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the auxiliary light sensor 218, the second auxiliary light sensor 220, the first light sensor 223, and the second light sensor 224.

The light source 4 that is interfaced with the utility waveguide 12 can be a laser chip that is separate from the LIDAR chip and then attached to the LIDAR chip. For instance, the light source 4 can be a laser chip that is attached to the chip using a flip-chip arrangement. Use of flip-chip arrangements is suitable when the light source 4 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the light source 4 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. When the light source 4 is a gain element or laser chip, the electronics 32 can change the frequency of the outgoing LIDAR signal by changing the level of electrical current applied to through the gain element or laser cavity.

Suitable electronics 32 can include, but are not limited to, an electronic controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the electronic controller has access to a memory that includes instructions to be executed by the electronic controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demultiplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demultiplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
at least one optical component configured to output a system output signal that travels away from the LIDAR system and can be reflected by an object located outside of the LIDAR system, the LIDAR system configured such that the system output signal and a tapped signal each includes light from an outgoing LIDAR signal; and
a control mechanism configured to control one or more process variables of the system output signal, the control mechanism generating an electrical process variable signal from the tapped signal and using the electrical process variable signal to control the process variable,
the process variable signal including an in-phase component and a quadrature component, and
the control mechanism being configured to multiply the process variable signal by a local signal that includes an in-phase component and a quadrature component.

2. The system of claim 1, wherein the control mechanism is a control loop.

3. The system of claim 2, wherein the control loop is feedback control loop.

4. The system of claim 1, wherein the control mechanism uses the electrical process variable signal to determine the value of the process variable for the system output signal.

5. The system of claim 4, wherein the control mechanism includes a Mach-Zehnder interferometer that receives the tapped signal and is configured to generate an optical signal from the tapped signal, the optical signal having an in-phase component and a quadrature component.

6. The system of claim 5, wherein the Mach-Zehnder interferometer is configured to split light from the tapped signal onto a delayed waveguide and an expedited waveguide, a length of the delayed waveguide being longer than a length of the expedited waveguide by less than 100 cm.

7. The system of claim 1, wherein the control mechanism includes a Mach-Zehnder interferometer configured to generate an optical signal, the optical signal having an in-phase component and a quadrature component.

8. The system of claim 7, wherein the optical signal is beating.

9. The system of claim 7, wherein the Mach-Zehnder interferometer is included on a LIDAR chip.

10. The system of claim 7, wherein the LIDAR chip is constructed on a silicon-on-insulator platform.

11. The system of claim 10, wherein the control mechanism uses the electrical process variable signal to determine the value of the process variable for the system output signal, and
the system output signal, the tapped signal, and the outgoing LIDAR signal are each guided by a different waveguide on the LIDAR chip.

12. The system of claim 5, wherein the control mechanism is configured to convert the optical signal to the electrical process variable signal.

13. The system of claim 1, wherein the process variable is a frequency of the system output signal.

14. The system of claim 13, wherein the frequency of the system output signal is varied in a repeating cycle and a value of the frequency of the system output signal is determined at a frequency that is more than 100 times per a duration of the cycle.

15. The system of claim 1, wherein a frequency of the system output signal is varied at a non-zero rate for a duration of a data period and the value of the frequency of the system output signal is determined more than 100 times during the duration of the data period.

16. The system of claim 1, wherein the process variable is a phase of the system output signal.

17. A method, comprising:
  causing a LIDAR system to output a system output signal that travels away from the LIDAR system and can be reflected by an object located outside of the LIDAR system, the system output signal and a tapped signal each includes light from an outgoing LIDAR signal; and
  controlling one or more process variables of the system output signal, controlling the one or more process variables including generating an electrical process variable signal from the tapped signal and using the electrical process variable signal to control the process variable,
    the process variable signal including an in-phase component and a quadrature component, and
    controlling the one or more process variables including multiplying the process variable signal by a local signal that includes an in-phase component and a quadrature component.

18. The system of claim 1, wherein the control mechanism is configured to multiply the process variable signal by the local signal such that the in-phase component of the process variable signal is multiplied by the quadrature component of the local signal and the quadrature component of the process variable signal is multiplied by the in-phase component of the local signal.

19. The system of claim 18, wherein the control mechanism includes a first multiplier configured to multiply the in-phase component of the process variable signal by the quadrature component of the local signal so as to generate a first multiplied signal,
  the control mechanism includes a second multiplier configured to multiply the quadrature component of the process variable signal by the in-phase component of the local signal so as to generate a second multiplied signal, and
  an adder configured to add the first multiplied signal and the second multiplied signal so as to generate a control signal.

20. The system of claim 19, wherein the control mechanism includes a Time-to-Digital Converter (TDC) configured to receive the control signal and outputs an indicator signal with a voltage that is related to the frequency of the tapped signal.

* * * * *